United States Patent
Tsai

(10) Patent No.: US 8,673,177 B2
(45) Date of Patent: Mar. 18, 2014

(54) LIQUID CRYSTAL ALIGNMENT AGENT, AND LIQUID CRYSTAL ALIGNMENT FILM AND LIQUID CRYSTAL DISPLAY ELEMENT FORMED FROM THE LIQUID CRYSTAL ALIGNMENT AGENT

(75) Inventor: Tsung-Pei Tsai, Tainan (TW)

(73) Assignee: Chi Mei Corporation, Tainan (TW)

( * ) Notice: Subject to any disclaimer, the term of this patent is extended or adjusted under 35 U.S.C. 154(b) by 215 days.

(21) Appl. No.: 13/238,598

(22) Filed: Sep. 21, 2011

(65) Prior Publication Data

US 2012/0101224 A1 Apr. 26, 2012

(30) Foreign Application Priority Data

Oct. 26, 2010 (TW) .................................. 99136486 A

(51) Int. Cl.
*C09K 19/56* (2006.01)
*C08G 73/10* (2006.01)
*C08L 79/08* (2006.01)

(52) U.S. Cl.
USPC ....... 252/299.4; 428/1.2; 428/1.25; 428/1.26; 524/600

(58) Field of Classification Search
CPC ....... C09K 19/56; C08G 73/1042; C08J 5/18; C08J 2379/08; C08L 79/08; G02F 1/133723
USPC ......... 252/299.4; 428/1.25, 1.2; 524/592, 600
See application file for complete search history.

(56) References Cited

U.S. PATENT DOCUMENTS

| | | | |
|---|---|---|---|
| 7,524,541 B2 * | 4/2009 | Tsutsui et al. | 428/1.26 |
| 2002/0045033 A1 * | 4/2002 | Uhara et al. | 428/195 |
| 2004/0031950 A1 | 2/2004 | Shimizu et al. | |
| 2006/0051525 A1 * | 3/2006 | Tsutsui et al. | 428/1.26 |
| 2011/0255042 A1 | 10/2011 | Hsueh | |
| 2011/0313126 A1 | 12/2011 | Hsueh | |
| 2012/0162588 A1 | 6/2012 | Tsai | |

FOREIGN PATENT DOCUMENTS

| | | |
|---|---|---|
| JP | 2-282726 A | 11/1990 |
| JP | 3-179323 A | 8/1991 |
| JP | 7-043725 A | 2/1995 |
| JP | 7-110484 A | 4/1995 |
| JP | 7-234410 A | 9/1995 |
| JP | 10-333153 A | 12/1998 |
| JP | 11-193345 A | 7/1999 |
| JP | 2002-162630 A | 6/2002 |
| JP | 2003-096034 A | 4/2003 |
| JP | 2006-023344 A | 1/2006 |
| JP | 2006-028098 A | 2/2006 |
| TW | 200745697 | 12/2007 |
| TW | 200948859 | 12/2009 |
| TW | 201005007 | 2/2010 |
| WO | WO-00/61684 A1 | 10/2000 |
| WO | WO-2007/078153 A1 | 7/2007 |

OTHER PUBLICATIONS

U.S. Appl. No. 13/572,350, filed Aug. 10, 2012, by TSAI, Tsung-Pei.

* cited by examiner

*Primary Examiner* — Shean C Wu
(74) *Attorney, Agent, or Firm* — CKC & Partners Co., Ltd.

(57) ABSTRACT

A liquid crystal alignment agent includes a polymer and an organic solvent for dissolving the polymer. The polymer is obtained by subjecting a diamine composition and a tetracarboxylic dianhydride compound to a polymerization reaction. The diamine composition includes a first diamine compound, a second diamine compound, and a third diamine compound as defined in the specification.

A liquid crystal alignment film formed from the liquid crystal alignment agent and a liquid crystal display element including the liquid crystal alignment film are also disclosed.

9 Claims, 1 Drawing Sheet

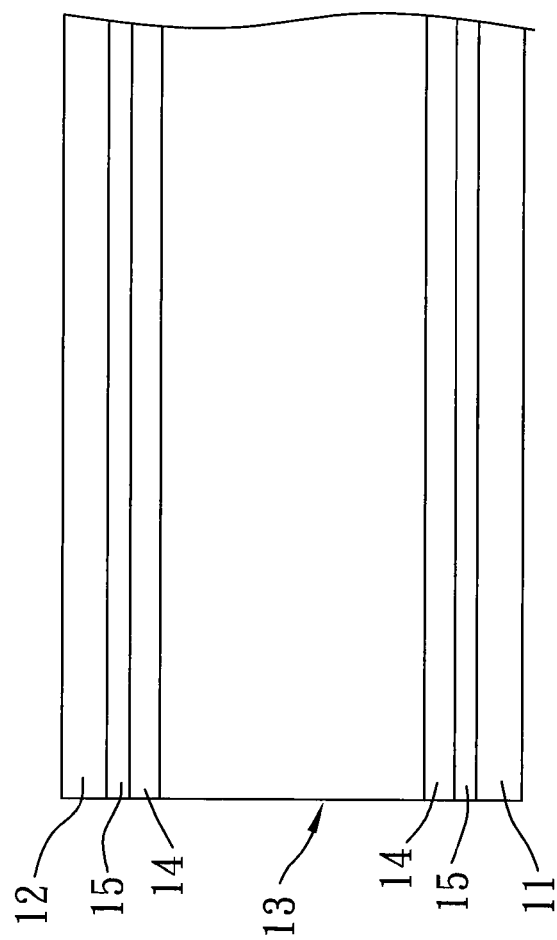

LIQUID CRYSTAL ALIGNMENT AGENT, AND LIQUID CRYSTAL ALIGNMENT FILM AND LIQUID CRYSTAL DISPLAY ELEMENT FORMED FROM THE LIQUID CRYSTAL ALIGNMENT AGENT

CROSS-REFERENCE TO RELATED APPLICATION

This application claims priority of Taiwanese Application No. 099136486, filed on Oct. 26, 2010.

BACKGROUND OF THE INVENTION

1. Field of the Invention

This invention relates to a liquid crystal alignment agent, more particularly to a vertical liquid crystal alignment agent having improved voltage holding ratio and reliability. The invention also relates to a liquid crystal alignment film formed from the liquid crystal alignment agent, and a liquid crystal display element including the liquid crystal alignment film.

2. Description of the Related Art

Nematic liquid crystal display elements are predominantly used in general liquid crystal display elements, and concrete examples of the nematic liquid crystal display elements actually used include: (1) a TN (Twisted Nematic) liquid crystal display element, in which a liquid crystal alignment direction of one side substrate is twisted at a 90 degree angle relative to a liquid crystal alignment direction of the other side substrate; (2) a STN (Super Twisted Nematic) liquid crystal display element, in which a liquid crystal alignment direction of one side substrate is twisted at an angle greater than 180 degrees relative to a liquid crystal alignment direction of the other side substrate; and (3) a TFT (Thin Film Transistor) liquid crystal display element which uses a thin film transistor.

The display panel made of the TN liquid crystal display element has a disadvantage of narrow viewing angle, and therefore, cannot satisfy the requirement for a wide viewing angle when applied to a large-sized display device, such as a liquid crystal display television.

To address the problem of the viewing angle, the following solutions are provided: (1) a TN liquid crystal display element used with an optical compensation film, (2) a VA (vertical alignment) liquid crystal display element used with an optical compensation film, (3) a MVA (Multi-domain Vertical Alignment) liquid crystal display element using vertical alignment and protrusion technologies, (4) an IPS (In-Plane Switching) liquid crystal display element, (5) an ECB (Electrically Controlled Birefringence) liquid crystal display element, and (6) an OCB (Optically Self-compensated Birefringence) liquid crystal display element. Among them, the MVA liquid crystal display element using vertical alignment and protrusion technologies and the IPS liquid crystal display element are relatively commonly used in the art.

In the MVA liquid crystal display element, the vertical alignment of the liquid crystal is primarily controlled by a liquid crystal alignment film so as to form the liquid crystal with a high pretilt angle. The liquid crystal alignment film is made from a liquid crystal alignment agent. Conventionally, the liquid crystal alignment agent is formulated by dissolving polyamic acid or polyimide in an organic solvent, and is then applied and cured on a substrate to form the liquid crystal alignment film. Two substrates each having the liquid crystal alignment film formed thereon are prepared and arranged to oppose each other with a space (cell gap). The peripheral portions of the two substrates are joined together with a sealing agent, liquid crystals are filled into the cell gap defined by the surfaces of the substrates and the sealing agent, and an injection hole is sealed up to form a liquid crystal cell.

JP 2002-162630 discloses a liquid crystal alignment film made of a polymer obtained by subjecting a diamine compound having an aromatic or cycloaliphatic side chain and a tetracarboxylic dianhydride compound to conduct a polymerization reaction.

It is increasingly required for a liquid crystal display device of large size to have enhanced reliability. However, such a requirement regarding reliability and voltage holding ratio can not achieved by conventional vertical liquid crystal alignment films. Therefore, it is still required in the art to develop a liquid crystal alignment agent which can be used to make a liquid crystal display element having superior reliability and high voltage holding ratio.

SUMMARY OF THE INVENTION

Therefore, an object of the present invention is to provide a liquid crystal alignment agent which has improved alignment properties.

According to the first aspect of this invention, there is provided a liquid crystal alignment agent, which includes a polymer and a solvent for dissolving the polymer.

The polymer is obtained by subjecting a diamine composition and a tetracarboxylic dianhydride compound to a polymerization reaction. The diamine composition includes:

a first diamine compound represented by formula (I-1),

wherein $R^1$ is a $C_1$-$C_6$ alkylene group, $X^1$ is selected from the group consisting of an oxy group, an ester group, a keto group, and an amido group, and $R^2$ is selected from the group consisting of a $C_1$-$C_6$ alkyl group, a $C_1$-$C_6$ alkoxy group, a $C_1$-$C_6$ aklenyl group, a $C_6$-$C_{20}$ aryl group, and a $C_7$-$C_{20}$ aralkyl group, a second diamine compound which is at least one selected from the group consisting of compounds represented by the following formulae (I-2) to (I-5),

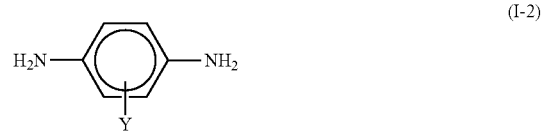

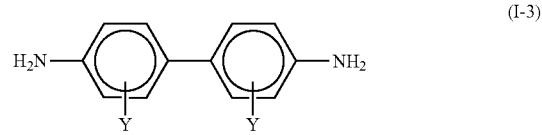

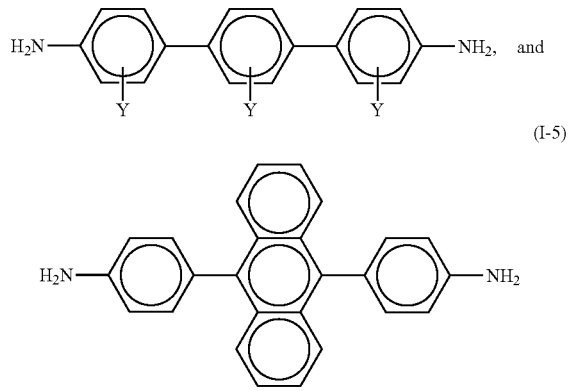

(I-4)

(I-5)

wherein each Y is independently selected from the group consisting of hydrogen, an alkyl group, an amido group, an alkoxy group, and a halogen, and each Y in formulae (I-3) and (I-4) may be the same or different, and a third diamine compound with the proviso that the third diamine compound is different from either one of the first diamine compound and the second diamine compound.

According to the second aspect of this invention, there is provided a liquid crystal alignment film formed from the liquid crystal alignment agent of this invention.

According to the third aspect of this invention, there is provided a liquid crystal display element including the liquid crystal alignment film of this invention.

BRIEF DESCRIPTION OF THE DRAWING

Other features and advantages of the present invention will become apparent in the following detailed description of the preferred embodiments with reference to the accompanying drawing, of which:

FIG. 1 is a fragmentary schematic view of a preferred embodiment of a liquid crystal display element according to this invention.

DETAILED DESCRIPTION OF THE PREFERRED EMBODIMENTS

The liquid crystal alignment agent of the present invention is of a vertical alignment type, and includes a polymer, and a solvent for dissolving the polymer.

The polymer is obtained by subjecting a diamine composition and a tetracarboxylic dianhydride compound to a polymerization reaction.

The tetracarboxylic dianhydride compound is used in an amount ranging preferably from 0.2 to 2.0 molar equivalents, more preferably from 0.3 to 1.2 molar equivalents based on 1 molar equivalent of the diamine composition.

The diamine composition includes a first diamine compound, a second diamine compound and a third diamine compound.

The first diamine compound is represented by formula (I-1),

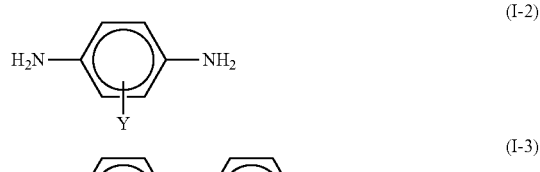

wherein $R^1$ is a $C_1$-$C_6$ alkylene group, $X^1$ is selected from the group consisting of an oxy group, an ester group, a keto group, and an amido group, and $R^2$ is selected from the group consisting of a $C_1$-$C_6$ alkyl group, a $C_1$-$C_6$ alkoxy group, a $C_1$-$C_6$ aklenyl group, a $C_6$-$C_{20}$ aryl group, and a $C_7$-$C_{20}$ aralkyl group.

The second diamine compound is at least one selected from the group consisting of compounds represented by the following formulae (I-2) to (I-5),

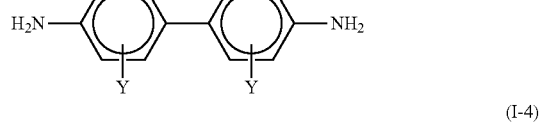

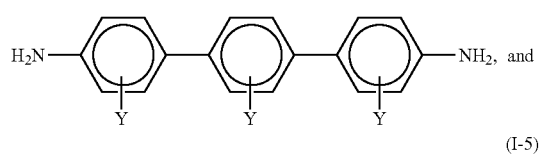

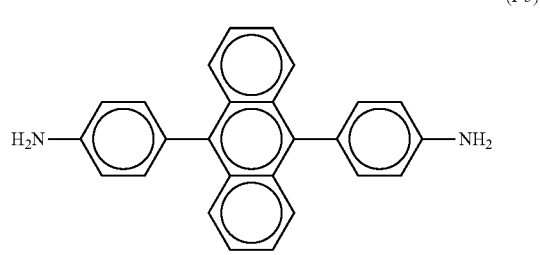

wherein each Y is independently selected from the group consisting of hydrogen, an alkyl group, an amido group, an alkoxy group, and a halogen, and each Y in formulae (I-3) and (I-4) may be the same or different.

The third diamine compound is different from either one of the first diamine compound and the second diamine compound.

It should be noted that a liquid crystal display element may have inferior voltage holding ratio when the first diamine compound is not used for the preparation of the polymer used for the liquid crystal alignment agent, and that a liquid crystal display element may have inferior reliability when the second diamine compound is not used for the preparation of the polymer used for the liquid crystal alignment agent.

In order to provide the liquid crystal display element with superior voltage holding ratio and reliability, the total amount of the first and second diamine compounds ranges generally from 10 to 90 mole %, preferably from 20 to 90 mole %, and more preferably from 30 to 90 mole %, based on 100 mole % of the diamine composition.

Furthermore, the molar ratio of the first diamine compound to the second diamine compound is controlled to a range generally from 90/10 to 10/90, preferably from 85/15 to 15/85, and more preferably from 80/20 to 20/80, in order to provide the liquid crystal display element with superior reliability.

Examples of the first diamine compound suitable for the present invention include, but are not limited to, 2,4-diaminophenylformic acid ethyl ester, 3,5-diaminophenylformic acid ethyl ester, 2,4-diaminophenylformic acid propyl ester, 3,5-diaminophenylformic acid propyl ester, 2,4-diaminophenylacetic acid methyl ester, 3,5-diaminophenylacetic acid methyl ester, 2,4-diaminophenylacetic acid ethyl ester, 3,5-diaminophenylacetic acid ethyl ester, 2,4-diaminophenylacetic acid propyl ester, 3,5-diaminophenylacetic acid propyl ester, 2,4-diaminophenylacetic acid butyl ester, 3,5-diaminophenylacetic acid butyl ester, 2,4-diaminophenylpropanoic acid ethyl ester, 3,5-diaminophenylpropanoic acid ethyl ester, 1,3-diamino-4-(2-methoxymethyl)benzene), 1,3-diamino-4-(2-ethoxymethyl)benzene, 1,3-diamino-4-(2-propoxymethyl)benzene, 1,3-diamino-4-(2-butoxymethyl)benzene, 1,3-diamino-4-(2-methoxyethyl)benzene, 1,3-diamino-4-(2-ethoxyethyl)benzene, 1,3-diamino-4-(2-propoxyethyl)benzene, 1,3-diamino-4-(2-butoxyethyl)benzene, 1,3-diamino-5-(2-methoxymethyl)benzene, 1,3-diamino-5-(2-ethoxymethyl)benzene, 1,3-diamino-5-(2-propoxymethyl)benzene, 1,3-diamino-5-(2-butoxymethyl)benzene, 1,3-diamino-5-(2-methoxyethyl)benzene, 1,3-diamino-5-(2-ethoxyethyl)benzene, 1,3-diamino-5-(2-propoxyethyl)benzene, 1,3-diamino-5-(2-butoxyethyl)benzene, or the like. Among them, 2,4-diaminophenylacetic acid methyl ester, 2,4-diaminophenylacetic acid ethyl ester, 3,5-diaminophenylacetic acid ethyl ester, 2,4-diaminophenylpropanoic acid ethyl ester, 1,3-diamino-4-(2-butoxyethyl)benzene, and 1,3-diamino-4-(2-propoxyethyl)benzene are preferable.

The synthesis for the first diamine compound is illustrated as follows using 1,3-diamino-4-(2-butoxyethyl)benzene and 2,4-diaminophenylacetic acid methyl ester as examples.

1,3-diamino-4-(2-butoxyethyl)benzene is obtained by reducing 2,4-dinitrophenylacetic acid using a strong reducing agent (e.g., sodium borohydride) in a solvent, followed by a Williamson ether reaction using halogenated butane.

2,4-diaminophenylacetic acid methyl ester is obtained by reacting 2,4-dinitrophenylacetic acid with trimethylsilyldiazomethane to obtain 2,4-dinitrophenylacetic acid methyl ester, followed by reducing 2,4-dinitrophenylacetic acid methyl ester using a strong reducing agent.

Preferable examples of the first diamine compound suitable for the present invention include, but are not limited to, 2,4-diaminophenylacetic acid methyl ester, 2,4-diaminophenylacetic acid ethyl ester, 3,5-diaminophenylacetic acid ethyl ester, 2,4-diaminophenylpropanoic acid ethyl ester, 1,3-diamino-4-(2-butoxyethyl)benzene, and 1,3-diamino-4-(2-propoxyethyl)benzene.

Examples of the second diamine compound of formula (I-2) suitable for the present invention include, but are not limited to, p-phenylenediamine, m-phenylenediamine, o-phenylene diamine, 2,5-diaminotoluene, or the like.

Examples of the second diamine compound of formula (I-3) suitable for the present invention include, but are not limited to, 4,4'-diaminobiphenyl, 2,2'-dimethyl-4,4'-diaminobiphenyl, 3,3'-dimethyl-4,4'-diaminobiphenyl, 3,3'-dimethoxy-4,4'-diaminobiphenyl, 2,2'-dichloro-4,4'-diaminobiphenyl, 3,3'-dichloro-4,4'-diaminobiphenyl, 2,2',5,5'-tetrachloro-4,4'-diaminobiphenyl, 2,2'-dichloro-4,4'-diamino-5,5'-dimethoxybiphenyl, 4,4'-diamino-2,2'-bis(trichloromethyl)biphenyl, or the like.

Examples of the second diamine compound of formula (I-4) suitable for the present invention include, but are not limited to, 1,4'-bis(4-aminophenyl)benzene, or the like.

Among the examples of the second diamine compound, p-phenylene diamine, 2,5-diaminotoluene, 4,4'-diaminobiphenyl, 3,3'-dimethoxy-4,4'-diaminobiphenyl, 1,4'-bis(4-aminophenyl)benzene, and the diamine compound of formula (I-5) are preferable.

The third diamine compound includes aliphatic, alicyclic, or aromatic diamine compounds.

Examples of the aliphatic, alicyclic, or aromatic diamine compounds suitable for the present invention include, but are not limited to, the compounds represented by the following formulae (I-6) to (I-12) and formulae (1) to (5):

(I-6)

wherein, $R^3$ is a monovalent organic group that has a ring structure containing a nitrogen atom and that is selected from the group consisting of pyridine, pyrimidine, triazine, piperidine and piperazine; and $X^2$ is a divalent organic group,

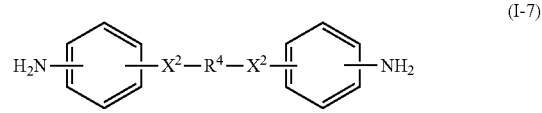

(I-7)

wherein, each $X^2$ is independently a divalent organic group and may be the same or different, and $R^4$ is a divalent organic group that has a ring structure containing a nitrogen atom and that is selected from the group consisting of pyridine, pyrimidine, triazine, piperidine and piperazine,

(I-8)

wherein, $R^5$ is a divalent organic group selected from the group consisting of —O—, —COO—, —OCO—, —NHCO—, —CONH—, and —CO—; $R^6$ is a monovalent organic group having a group selected from the group consisting of a steroid skeleton, a trifluoromethyl group, and a fluoro group, or an alkyl group having 6 to 30 carbon atoms,

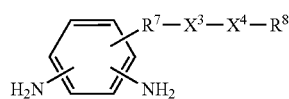
(I-9)

wherein, $R^7$ is a divalent organic group selected from the group consisting of —O—, —COO—, —OCO—, —NHCO—, —CONH—, and —CO—; $X^3$ and $X^4$ are independently selected from the group consisting of an alicyclic group, an aromatic group, and a heterocyclic group; and $R^8$ is selected from the group consisting of an alkyl group having 3 to 18 carbon atoms, an alkoxy group having 3 to 18 carbon atoms, a fluoroalkyl group having 1 to 5 carbon atoms, a fluoroalkoxy group having 1 to 5 carbon atoms, a cyano group, and halogen atoms,

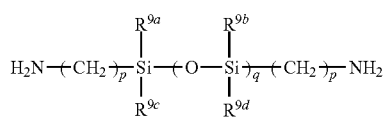
(I-10)

wherein, $R^{9a}$, $R^{9b}$, $R^{9c}$, $R^{9d}$ are independently a hydrocarbon group having 1 to 12 carbon atoms, p is an integer ranging from 1 to 3, and q is an integer ranging from 1 to 20,

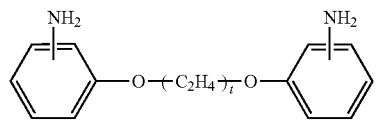
(I-11)

wherein, t is an integer ranging from 2 to 12,

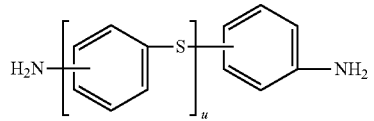
(I-12)

wherein, u is an integer ranging from 1 to 5,

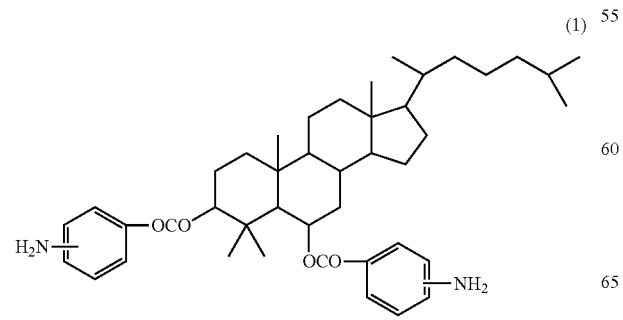
(1)

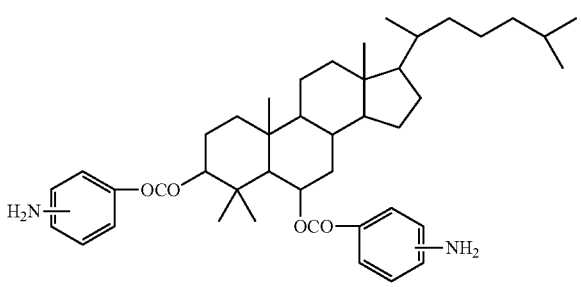
(2)

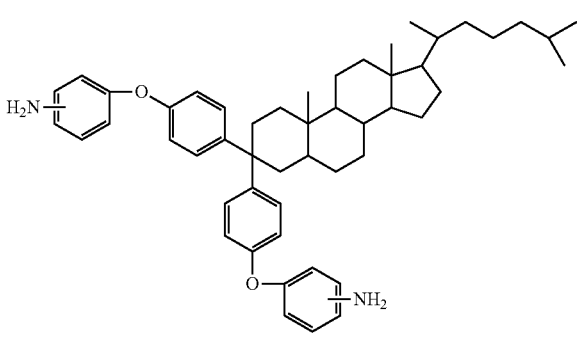
(3)

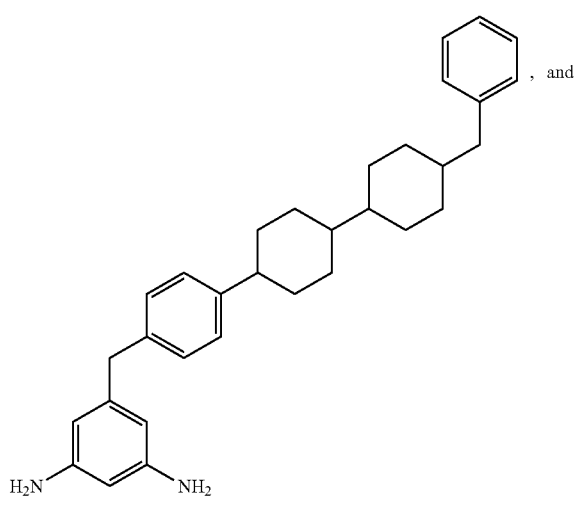
(4), and

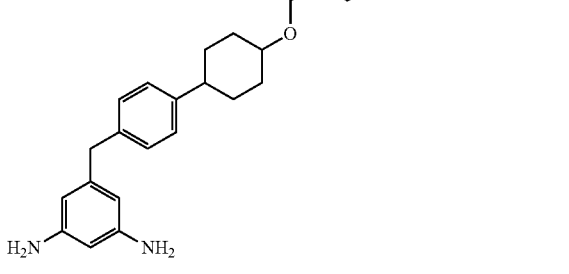
(5)

These diamine compounds may be used alone or in admixture of two or more. It should be noted that the compounds represented by the aforesaid formulae (I-6) and (I-7) are diamines having two primary amino groups and a nitrogen atom other than the primary amino group in the molecule.
Preferably, the diamine compounds represented by the aforesaid formulae (I-6) to (I-9) are selected from the group consisting of the compounds represented by following formulae (6) to (31).
(6)
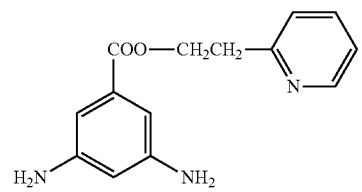
(7)
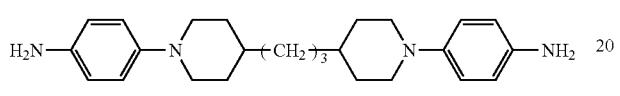
(8)
(9)
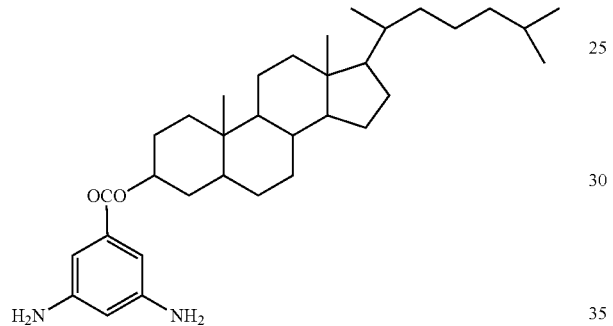
(10)
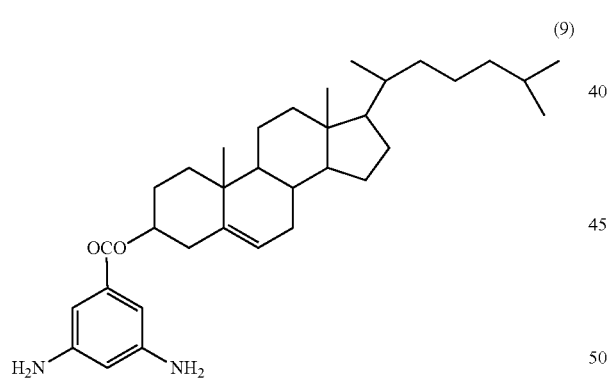
(11)
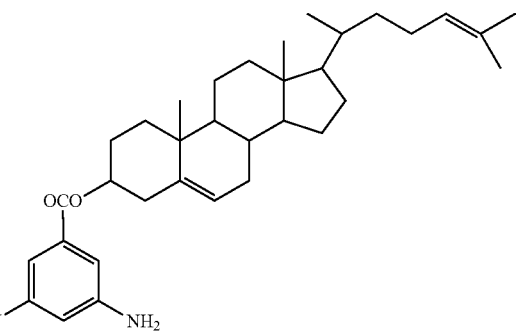
(12)
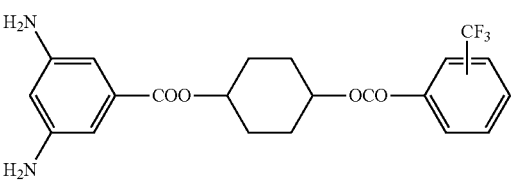
(13)
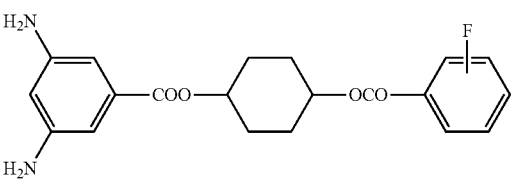
(14)
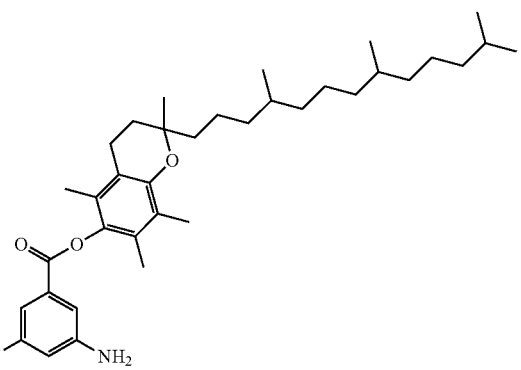
(15)
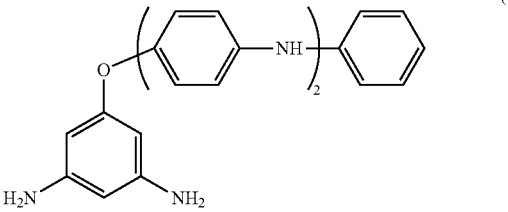
(16)
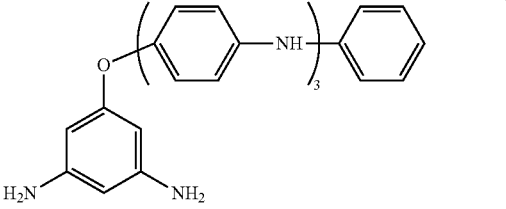

wherein, v is an integer ranging from 3 to 12.

Examples of aliphatic or alicyclic diamine compounds include o-phenylene diamine, m-phenylene diamine, 1,3-diaminopropane, 1,4-diaminobutane, 1,5-diaminopentane, 1,6-diaminohexane, 1,7-diaminoheptane, 1,8-diaminooctane, 1,9-diaminononane, 4,4-diaminoheptamethylenediamine, 1,4-diaminocyclohexane, isophoronediamine, tetrahydrodicyclopentadienylene diamine, hexahydro-4,7-methanoindanylenedimethylene diamine, tricyclic[6.2.1.0$^{2,7}$]-undecylenedimethylene diamine, and 4,4'-methylenebis(cyclohexylamine).

Examples of aromatic diamine compounds include 4,4'-diaminodiphenylmethane, 4,4'-diaminodiphenylethane, 4,4'-diaminodiphenylsulfide, 4,4'-diaminodiphenylsulfone, 4,4'-diaminobenzanilide, 4,4'-diaminodiphenylether, 1,5-diaminonaphthalene, 5-amino-1-(4'-aminophenyl)-1,3,3- trimethylindane, 6-amino-1-(4'-aminophenyl)-1,3,3-trimethylindane, 3,4'-diaminodiphenyl ether, 3,3'-diaminobenzophenone, 3,4'-diaminobenzophenone, 4,4'-diaminobenzophenone, 2,2-bis[4-(4-aminophenoxy)phenyl]propane, 2,2-bis[4-(4-aminophenoxy)phenyl]hexafluoropropane, 2,2-bis(4-aminophenyl)hexafluoropropane, 2,2-bis[4-(4-aminophenoxy)phenyl]sulfone, 1,4-bis(4-aminophenoxy)benzene, 1,3-bis(4-aminophenoxy)benzene, 1,3-bis(3-aminophenoxy)benzene, 9,9-bis(4-aminophenyl)-10-hydroanthracene, 2,7-diaminofluorene, 9,9-bis(4-aminophenyl)fluorene, 4,4'-methylene-bis(2-chloroaniline), 4,4'-(p-phenyleneisopropylidene)bisaniline, 4,4'-(m-phenyleneisopropylidene)bisaniline, 2,2'-bis[4-(4-amino-2-trifluoromethylphenoxy)phenyl]hexafluoropropane, and 4,4'-bis[(4-amino-2-trifluoromethyl)phenoxy]octafluorobiphenyl.

In addition to the aforesaid aliphatic, alicyclic, or aromatic diamine compounds, other diamine compounds well known in the art can also be used. Examples of the other diamine compounds include 2,3-diaminopyridine, 2,6-diaminopyridine, 3,4-diaminopyridine, 2,4-diaminopyrimidine, 5,6-diamino-2,3-dicyanopyrazine, 5,6-diamino-2,4-dihydroxypyrimidine, 2,4-diamino-6-dimethylamino-1,3,5-triazine, 1,4-bis(3-aminopropyl)piperazine, 2,4-diamino-6-isopropoxy-1,3,5-triazine, 2,4-diamino-6-methoxy-1,3,5-triazine, 2,4-diamino-6-phenyl-1,3,5-triazine, 2,4-diamino-6-methyl-s-triazine, 2,4-diamino-1,3,5-triazine, 4,6-diamino-2-vinyl-s-triazine, 2,4-diamino-5-phenylthiazole, 2,6-diaminopurin, 5,6-diamino-1,3-dimethyluracil, 3,5-diamino-1,2,4-triazole, 6,9-diamino-2-ethoxyl acridine lactate, 3,8-diamino-6-phenylphenanthridine, 1,4-diaminopiperazine, 3,6-diaminoacridine, and 1,4-bis(4-aminophenoxy)benzene.

Tetracarboxylic dianhydride compounds suitable for the present invention include aliphatic tetracarboxylic dianhydride, alicyclic tetracarboxylic dianhydride, and aromatic tetracarboxylic dianhydride. These teracarboxylic dianhydride compounds may be used alone or in admixture of two or more.

Examples of aliphatic tetracarboxylic dianhydride include ethanetetracarboxylic dianhydride, butanetetracarboxylic dianhydride, or the like.

Examples of alicyclic tetracarboxylic dianhydride include 1,2,3,4-cyclobutanetetracarboxylicdianhydride, 1,2-dimethyl-1,2,3,4-cyclobutanetetracarboxylic dianhydride, 1,3-dimethyl-1,2,3,4-cyclobutanetetracarboxylic dianhydride, 1,3-dichloro-1,2,3,4-cyclobutanetetracarboxylic dianhydride, 1,2,3,4-tetramethyl-1,2,3,4-cyclobutanetetracarboxylic dianhydride, 1,2,3,4-cyclopentanetetracarboxylic dianhydride, 1,2,4,5-cyclohexanetetracarboxylic dianhydride, 3,3',4,4'-dicyclohexanetetracarboxylic dianhydride, cis-3,7-dibutylcycloheptyl-1,5-diene-1,2,5,6-tetracar boxylicdianhydride, 2,3,5-tricarboxylcyclopentylacetic dianhydride, 2,3,4,5-tetrahydrofurantetracarboxylic dianhydride, 3,4-dicarboxy-1,2,3,4-tetrahydronaphthalene-1-succinic acid dianhydride, 1,3,3a,4,5,9b-hexahydro-5-(tetrahydro-2,5-dioxo-3-furanyl)-naphtho[1,2-c]-furan-1,3-dione, 1,3,3a,4,5,9b-hexahydro-5-methyl-5-(tetrahydro-2,5-dioxo-3-furanyl)-naphtho[1,2-c]-furan-1,3-dione, 1,3,3a,4,5,9b-hexahydro-5-ethyl-5-(tetrahydro-2,5-dioxo-3-furanyl)-naphtho[1,2-c]-furan-1,3-dione, 1,3,3a,4,5,9b-hexahydro-7-methyl-5-(tetrahydro-2,5-dioxo-3-furanyl)-naphtho[1,2-c]-furan-1,3,-dione, 1,3,3a,4,5,9b-hexahydro-7-ethyl-5-(tetrahydro-2,5-dioxo-3-furanyl)-naphtho[1,2-c]-furan-1,3,-dione, 1,3,3a,4,5,9b-hexahydro-8-methyl-5-(tetrahydro-2,5-dioxo-3-furanyl)-naphtho[1,2-c]-furan-1,3-dione, 1,3,3a,4,5,9b-hexahydro-8-ethyl-5-(tetrahydro-2,5-dioxo-3-furanyl)-naphtho[1,2-c]-furan-1,3-dione, 1,3,3a,4,5,9b-hexahydro-5,8-dimethyl-5-(tetrahydro-2,5-dioxo-3-furanyl)-naphtho[1,2-c]-furan-1,3-dione, 5-(2,5-dioxotetrahydrofuranyl)-3-methyl-3-cyclohexene-1,2-dicarboxylic dianhydride, bicyclo[2.2.2]-octa-7-ene-2,3,5,6-tetracarboxylic dianhydride, and compounds represented by formulae (II-1) and (II-2):

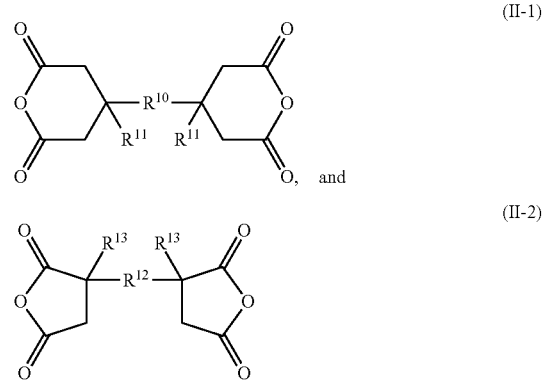

wherein, $R^{10}$ and $R^{12}$ are respectively a divalent organic group containing an aromatic ring, and $R^{11}$ and $R^{13}$ are respectively hydrogen or an alkyl group, with the proviso that a plurality of $R^{11}$'s and a plurality of $R^{13}$'s may be the same or different.

Examples of aromatic tetracarboxylic dianhydride include pyromellitic dianhydride, 3,3',4,4'-benzophenonetetracarboxylic dianhydride, 3,3',4,4'-biphenylsulfonetetracarboxylic dianhydride, 1,4,5,8-naphthalenetetracarboxylic dianhydride, 2,3,6,7-naphthalenetetracarboxylic dianhydride, 3,3'-4,4'-biphenylethanetetracarboxylic dianhydride, 3,3',4,4'-dimethyldiphenylsilanetetracarboxylic dianhydride, 3,3',4,4'-tetraphenylsilanetetracarboxylic dianhydride, 1,2,3,4-furantetracarboxylic dianhydride, 4,4'-bis(3,4-dicarboxyphenoxy)diphenylsulfide dianhydride, 4,4'-bis(3,4-dicarboxyphenoxy)diphenylsulfone dianhydride, 4,4'-bis(3,4-dicarboxyphenoxy)diphenylpropane dianhydride, 3,3',4,4'-perfluoroisopropylidenediphthalic dianhydride, 3,3',4,4'-diphenyltetracarboxylic dianhydride, bis(phthalic acid)phenylphosphine oxide dianhydride, p-phenylene-bis(triphenylphthalic acid) dianhydride, m-phenylene-bis(triphenylphthalic acid) dianhydride, bis(triphenylphthalic acid)-4,4'-diphenylether dianhydride, bis(triphenylphthalic acid)-4,4'-diphenylmethane dianhydride, ethylene glycol-bis(anhydrotrimellitate), propylene glycol-bis(anhydrotrimellitate), 1,4-butanediol-bis(anhydrotrimellitate), 1,6-hexanediol-bis(anhydrotrimellitate), 1,8-octanediol-bis(anhydrotrimellitate), 2,2-bis(4-hydroxyphenyl)propane-bis(anhydrotrimellitate), and aromatic tetracarboxylic dianhydride compounds represented by the following formulae (34)-(37).

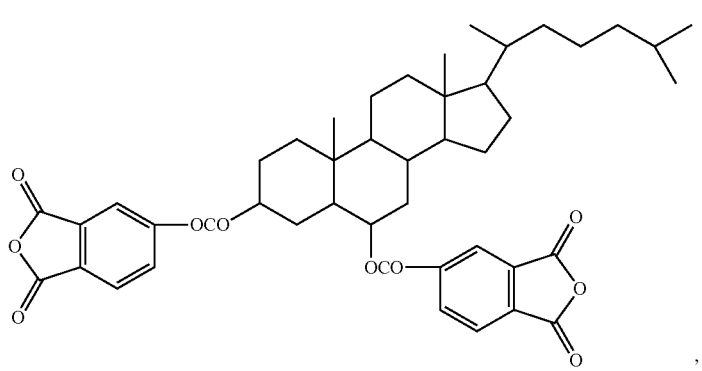
(34)
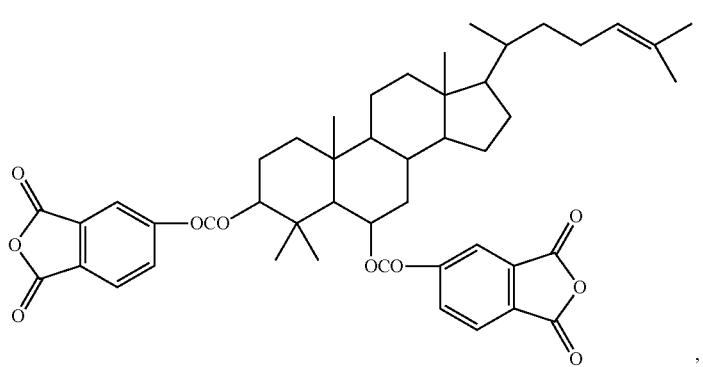
(35)
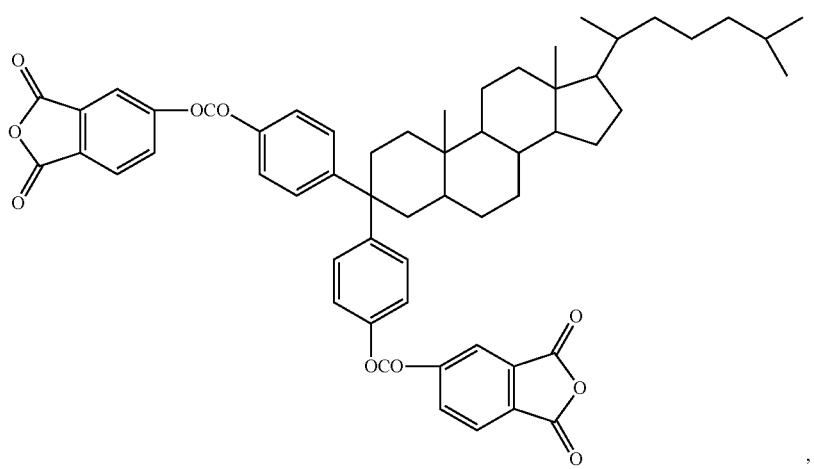
, and
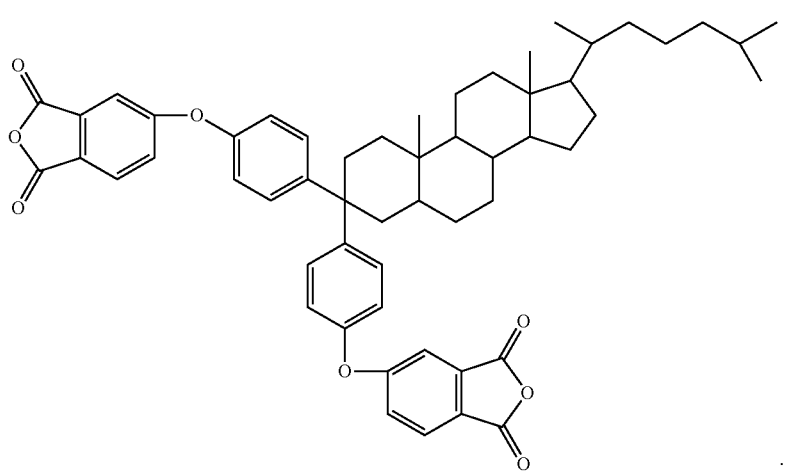
(36)
(37)

Among the aforementioned tetracarboxylic dianhydride compounds, 1,2,3,4-cyclobutanetetracarboxylic dianhydride, 1,2,3,4-cyclopentanetetracarboxylic dianhydride, 2,3,5-tricarboxycyclopentylacetic dianhydride, 3,4-dicarboxy-1,2,3,4-tetrahydronaphthalene-1-succinic acid dianhydride, pyromellitic dianhydride, 3,3',4,4'-benzophenonetetracarboxylic dianhydride, and 3,3',4,4'-diphenylsulfonetetracarboxylic dianhydride are preferred. Moreover, the compounds represented by the following formulae (38)-(40) are preferable examples of the compounds represented by the aforementioned formula (II-1), and the compounds represented by the following formula (41) is a preferable example of the compounds represented by the aforementioned formula (II-2):

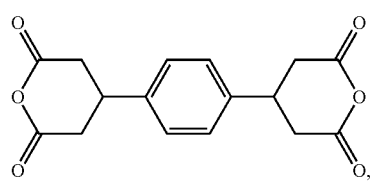

(38)

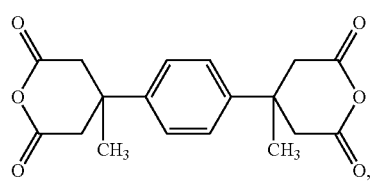

(39)

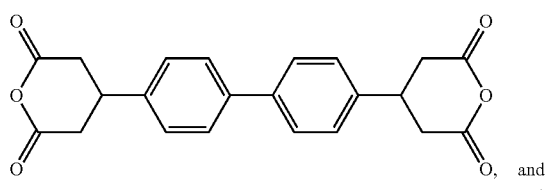

(40)

and

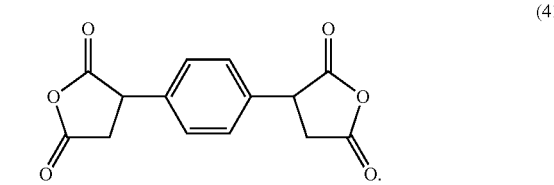

(41)

The polymer used for the liquid crystal alignment agent of the vertical alignment type of the present invention is obtained by subjecting the aforesaid tetracarboxylic dianhydride compound and the aforesaid diamine composition to a polymerization reaction. The polymer includes polyamic acid, polyimide, polyimide series block copolymer, or combinations thereof. The polyimide series block copolymer includes polyamic acid block copolymer, polyimide block copolymer, polyamic acid-polyimide block copolymer, or combinations thereof.

Preparation of Polyamic Acid:

A polycondensation reaction between the tetracarboxylic dianhydride compound and the diamine composition is conducted in an organic solvent at a temperature ranging from 0 to 100° C. for a period ranging from 1 to 24 hours to obtain a reaction solution containing the obtained polymer. The reaction solution is treated by pouring it into a large amount of poor solvent to obtain a precipitate, which is then dried under a reduced pressure to obtain the polymer. Alternatively, the polymer can be obtained by a treatment of distilling the reaction solution under a reduced pressure in a distillator.

There is no particular limitation to the organic solvent for the polycondensation as long as the organic solvent is able to dissolve the reactants and the products. Examples of the organic solvent include aprotic polar solvents, such as N-methyl-2-pyrrolidone, N, N-dimethylacetamide, N,N-dimethylformamide, dimethylsulfoxide, γ-butyrolactone, tetramethylurea, hexamethylphosphoric acid triamide, and the like; and phenolic solvents, such as m-cresol, xylenol, phenol, halogenated phenols, and the like.

The aforementioned organic solvents can be used in combination with a poor solvent, such as alcohols, ketones, esters, ethers, halogenated hydrocarbon compounds, hydrocarbon compounds, and the like in such an amount that does not cause precipitation of the formed polymer. Examples of the poor solvent include methyl alcohol, ethyl alcohol, isopropyl alcohol, cyclohexanol, ethylene glycol, propylene glycol, 1,4-butanediol, triethylene glycol, acetone, methyl ethyl ketone, methyl isobutyl ketone, cyclohexanone, methyl acetate, ethyl acetate, butyl acetate, diethyl oxalate, diethyl malonate, diethyl ether, ethylene glycol methyl ether, ethylene glycol ethyl ether, ethylene glycol n-propyl ether, ethylene glycol isopropyl ether, ethylene glycol n-butyl ether, ethylene glycol dimethyl ether, ethylene glycol ethyl ether acetate, diethylene glycol dimethyl ether, tetrahydrofuran, dichloromethane, 1,2-dichloroethane, 1,4-dichlorobutane, trichloroethane, chlorobenzene, o-dichlorobenzene, hexane, heptane, octane, benzene, toluene, xylene, or the like.

Preparation of Polyimide:

Polyimide in the present invention is obtained by further dehydration/ring-closure (imidization) processing of the aforesaid polyamic acid to transfer the amic acid functional group of the polyamic acid into the imido functional group.

When the imidization ratio for imidizing the polyamic acid into the polyimide is larger than 5%, the liquid crystal display element produced thereby has a better voltage holding ratio. In view of the voltage holding ratio of the liquid crystal display element, the imidization ratio is preferably larger than 10%, and is more preferably larger than 20%.

On the other hand, when the imidization ratio is smaller than 90%, the liquid crystal alignment agent produced thereby has a better coating property. In view of the coating property of the liquid crystal alignment agent, the imidization ratio is preferably smaller than 75%, and is more preferably smaller than 60%.

The imidization processing of the polyamic acid polymer is conducted by, for example, dissolving the polyamic acid in an organic solvent, and heating in the presence of a dehydrating agent and imidization catalyst to implement a dehydration/ring-closing reaction. In view of the imidization ratio, reaction temperature for the imidization processing is generally from 40 to 200° C., and preferably from 80 to 150° C. If the reaction temperature of the imidization processing is lower than 40° C., then the dehydration ring-closing reaction cannot be fully implemented. On the other hand, if the reaction temperature exceeds 200° C., then the weight average molecular weight of the obtained polyimide is reduced.

Examples of the dehydrating agent suitable for the imidization processing include an acid anhydride compound, such as acetic anhydride, propionic anhydride, trifluoroacetic anhydride, and the like. The used amount of the dehydrating agent is preferably from 0.01 to 20 moles per mole of the polyamic acid. Examples of the imidization catalyst suitable for the imidization processing include tertiary amines, such as pyridine, trimethylpyridine (collidine), dimethylpyridine (lutidine), triethylamine, and the like. The used amount of the imidization catalyst is preferably from 0.5 to 10 moles per mole of the dehydrating agent. The solvent used in the imidization processing is the same as the organic solvent useful for the aforementioned polycondensation reaction of the polyamic acid.

Preparation of Polyimide Series Block Copolymer:

A polyimide series block copolymer in the present invention comprises polyamic acid block copolymer, polyimide block copolymer, polyamic acid-polyimide block copolymer, and combinations thereof.

In the synthesis reaction of the polyimide series block copolymer, the polyimide series block copolymer is obtained by further polycondensation reaction of compounds selected from the polyamic acid, the polyimide, diamine compounds, and tetracarboxylic dianhydride compounds in an organic solvent. In the polycondensation reaction for the polyimide series block copolymer, the reaction temperature is generally from 0 to 200° C., preferably from 0 to 100° C., and examples of the solvent used for the polycondensation reaction are the same as those mentioned in the aforesaid polycondensation reaction for the polyamic acid.

Specifically, the polyimide series block copolymer can be obtained by a polycondensation reaction of first and second polyamic acids which are different from each other in structures and terminal groups thereof; first and second polyimides which are different from each other in structures and terminal groups thereof; a polyamic acid and a polyimide which are different from each other in structures and terminal groups thereof; a polyamic acid, a diamine compound, and a tetracarboxylic dianhydride compound, wherein at least one of the diamine compound and the tetracarboxylic dianhydride compound is structurally different from the one used in the polycondensation reaction for the polyamic acid; a polyimide, a diamine compound, and a tetracarboxylic dianhydride compound, wherein at least one of and the diamine compound and the tetracarboxylic dianhydride compound is structurally different from the one used in the polycondensation reaction for the polyimide; a polyamic acid, a polyimide, a diamine compound, and a tetracarboxylic dianhydride compound, wherein at least one of the diamine compound and the tetracarboxylic dianhydride compound is structurally different from the ones used in the polycondensation reaction for the polyamic acid and the polycondensation reaction for the polyimide; first and second polyamic acids, a diamine compound, and a tetracarboxylic dianhydride compound, wherein the first and second polyamic acids are structurally different from each other; first and second polyimides, a diamine compound, and a tetracarboxylic dianhydride compound, wherein the first and second polyimides are structurally different from each other; first and second polyamic acids and a diamine compound, wherein the first and second polyamic acids have anhydride terminal groups and are structurally different from each other; first and second polyamic acids and a tetracarboxylic dianhydride compound, wherein the first and second polyamic acids have amino terminal groups and are structurally different from each other; first and second polyimides and a diamine compound, wherein the first and second polyimides have anhydride terminal groups and are structurally different from each other; and first and second polyimides and a tetracarboxylic dianhydride compound, wherein the first and second polyimides have amino terminal groups and are structurally different from each other.

Terminal-Modified Polymer:

Additionally, the polyamic acid, the polyimide, and the polyimide series block copolymer used in the present invention can also be the polymers which are terminal-modified after an adjustment of molecular weight thereof. The terminal-modified polymers can be used to improve the properties of coating property and the like of the liquid crystal alignment agent as long as they will not reduce the effects of the present invention. The process for synthesizing the terminal-modified polymers involves adding monofunctional compounds such as monoanhydride compounds, monoamine compounds, monoisocyanate compounds, or the like to the reaction system during the synthesis reaction for the polyamic acid.

Examples of the monoanhydride compounds include maleicanhydride, phthalicanhydride, itaconicanhydride, n-decylsuccinicanhydride, n-dodecylsuccinicanhydride, n-tetradecyl succinic anhydride, n-hexadecyl succinic anhydride, and the like. Examples of monoamine compounds include aniline, cyclohexylamine, n-butylamine, n-amylamine, n-hexylamine, n-heptylamine, n-octylamine, n-nonylamine, n-decylamine, n-undecylamine, n-dodecylamine, n-tridecylamine, n-tetradecylamine, n-pentadecylamine, n-hexadecylamine, n-heptadecylamine, n-octadecylamine, n-eicosylamine, and the like. Examples of monoisocyanate compounds include phenyl isocyanate, naphthyl isocyanate, and the like.

Formation of Liquid Crystal Alignment Film:

Referring to FIG. 1, a preferred embodiment of a liquid crystal display element according to the present invention includes a first substrate 11, a second substrate 12 spaced apart from the first substrate 11, two conductive films 15 respectively disposed on the first and second substrates 11, 12 and facing toward each other, two alignment layers 14 respectively disposed on the conductive films 15 and facing toward each other, and liquid crystal 13 disposed between the alignment layers 14.

The polymer obtained by subjecting the diamine composition and the tetracarboxylic dianhydride compound to a polymerization reaction is dissolved in the organic solvent at a temperature ranging from 0 to 200° C. to form a liquid crystal alignment agent. The liquid crystal alignment agent is applied to respective one of the two conductive films 15 by a roller coating method, a spinner coating method, a printing method, an ink-jet method, or the like, and is then heated to form a coating film. The coating film is heat-treated to form the alignment layer 14 on respective one of the two conductive films 15. The thickness of the alignment layer 14 ranges preferably from 0.001 to 1 µm, more preferably from 0.005 to 0.5 µm.

The aforesaid heat treatment for the coating film comprises pre-bake and post-bake treatments after coating the liquid crystal alignment agent. The pre-bake treatment causes the organic solvent to volatilize and form a coating film. Temperature for the pre-bake treatment is generally from 30 to 120° C., preferably from 40 to 110° C., and more preferably from 50 to 100° C. The post-bake treatment is further carried out to conduct a dehydration/ring-closure (imidization) reaction so as to form the alignment layer 14. Temperature for the post-bake treatment is generally from 150 to 300° C., preferably from 180 to 280° C., and more preferably from 200 and 250° C.

Concentration of the solid content in the liquid crystal alignment agent of the present invention is adjusted according to the properties such as viscosity, volatility, or the like, and ranges generally from 1 to 15 wt %, preferably from 2 to 15 wt %, and more preferably from 3 to 15 wt %. When the liquid crystal alignment agent of the present invention is coated on a substrate surface to form a liquid crystal alignment film, the coating characteristics of the liquid crystal alignment agent may be better if the concentration of the solid content of the liquid crystal alignment agent falls within the range of from 1 to 15 wt %.

The additives such as functional silane containing compounds or epoxy group containing compounds may be added to the liquid crystal alignment agent of the present invention so as to improve adhesion of the liquid crystal alignment agent to the substrate to be applied as long as the intended properties of the liquid crystal alignment agent are not impaired.

Examples of the functional silane containing compounds include 3-aminopropyltrimethoxysilane, 3-aminopropyltriethoxysilane, 2-aminopropyltrimethoxysilane, 2-aminopropyltriethoxysilane, N-(2-aminoethyl)-3-aminopropyltrimethoxysilane, N-(2-aminoethyl)-3-aminopropylmethyldimethoxysilane, 3-ureidopropyltrimethoxysilane, 3-ureidopropyltriethoxysilane, N-ethoxycarbonyl-3-aminopropyltrimethoxysilane, N-ethoxycarbonyl-3-aminopropyltriethoxysilane, N-triethoxysilylpropyltriethylenetriamine, N-trimethoxysilylpropyltriethylenetriamine, 10-trimethoxysilyl-1,4,7-triazadecane, 10-triethoxysilyl-1,4,7-triazadecane, 9-trimethoxysilyl-3,6-diazanonylacetate, 9-triethoxysilyl-3,6-diazanonylacetate, N-benzyl-3-aminopropyltrimethoxysilane, N-benzyl-3-aminopropyltriethoxysilane, N-phenyl-3-aminopropyltrimethoxysilane, N-phenyl-3-aminopropyltriethoxysilane, N-bis(oxyethylene)-3-aminopropyltrimethoxysilane, N-bis(oxyethylene)-3-aminopropyltriethoxysilane, and the like.

Examples of the epoxy group containing compounds include ethylene glycol diglycidyl ether, polyethylene glycoldiglycidylether, propyleneglycoldiglycidylether, tripropylene glycol diglycidyl ether, polypropylene glycoldiglycidylether, neopentylglycoldiglycidylether, 1,6-hexanediol diglycidyl ether, glycerin diglycidyl ether, 2,2-dibromo-neopentyl glycol diglycidyl ether, 1,3,5,6-tetragylcidyl-2,4-hexanediol, N,N,N',N'-tetragylcidyl-m-xylenediamine, 1,3-bis(N,N-digylcidylaminomethyl)cyclohexane, N,N,N',N'-tetragylcidyl-4,4'-diaminodiphenylmethane, N,N-glycidyl-p-glycidoxyaniline, 3-(N-alkyl-N-glycidyl) aminopropyltrimethoxysilane, 3-(N,N-diglycidyl) aminopropyltrimethoxysilane, and the like.

Examples of the organic solvents used in the liquid crystal alignment agent of the present invention include 1-methyl-2-pyrrolidone, γ-butyrolactone, γ-butyrolactam, N,N-dimethylformamide, N,N-dimethylethanamide, 4-hydroxy-4-methyl-2-pentanone, ethylene glycol monomethyl ether, butyl lactate, butyl acetate, methyl methoxypropionate, ethyl ethoxypropionate, ethylene glycol methyl ether, ethylene glycol ethyl ether, ethylene glycol n-propyl ether, ethylene glycol isopropyl ether, ethylene glycol n-butyl ether (butyl cellosolve solvent), ethylene glycol dimethyl ether, ethylene glycol ethyl ether acetate, diglycol dimethyl ether, diglycol diethyl ether, diglycolmonomethyl ether, diglycolmonoethyl ether, diglycol monomethyl ether acetate, diglycol monoethyl ether acetate, and the like.

The liquid crystal alignment film 14 can be rubbed in a certain direction with a roller wound with a cloth made of nylon, rayon, or cotton fiber according to the requirements so as to afford the liquid crystal alignment film 14 with alignment energy. Moreover, protrusions can be formed on at least one substrate by widely known MVA (Multi-domain Vertical Alignment) or PVA (Patterned Vertical Alignment) methods to afford the liquid crystal molecules with the alignment energy for forming tilt in a predetermined angle.

Liquid Crystal Display Element:

Referring to FIG. 1, the first and second substrates 11, 12 suitable for the present invention are made of a transparent material, for example, alkali-free glass, soda-lime glass, hard glass (Pyrex glass), quartz glass, polyethylene terephthalate, polybutylene terephthalate, polyether sulphone, polycarbonate, or the like commonly used in liquid crystal display devices. The conductive films 15 may be a NESA® film (NESA® is the registered trademark of USA PPG Corporation) made of tin oxide $(SnO_2)_f$ or an ITO (indium tin oxide) film made of indium oxide-tin oxide $(In_2O_3—SnO_2)$, or the like.

The liquid crystal 13 is disposed between the alignment layers 14, is made of nematic liquid crystal material having negative dielectric anisotropy, and can be activated by the electric field produced by the conductive films 15. Examples of the nematic liquid crystal material include Shiff Base liquid crystals, azoxy liquid crystals, biphenyl liquid crystals, phenylcyclohexane liquid crystals, ester liquid crystals, terphenyl liquid crystals, biphenylcyclohexane liquid crystals, pyrimidine liquid crystals, dioxane liquid crystals, bicyclooctane liquid crystals, cubane liquid crystal, or the like. Moreover, cholesterol liquid crystals, such as cholesteryl chloride, cholesterylnonanoate, cholesteryl carbonate, or the like, and chiral agents sold under the trade names C-15, CB-15 (manufactured by Merck Company) may be added to the above liquid crystals, as required.

The liquid crystal alignment films 14 are vertical alignment type, and are respectively disposed on the conductive films 15 to provide the liquid crystal 13 disposed between the alignment layers 14 with high pretilt angle. The first substrate 11 is a thin film transistor side substrate, and the second substrate 12 is a color filter side substrate.

The first and second substrates 11, 12 each having the liquid crystal alignment film 14 formed thereon are prepared and arranged to oppose each other with a space (cell gap). The peripheral portions of the first and second substrates 11, 12 are joined together with a sealing agent, liquid crystals are filled into the cell gap defined by the surfaces of the substrates and the sealing agent, and an injection hole is sealed up to form a liquid crystal cell. Then, a polarizer is affixed to the exterior sides of the liquid crystal cell (i.e., the other sides of the first and second substrates 11, 12 forming the liquid crystal cell) to obtain the liquid crystal display element.

The sealing agent may be a general epoxy resin hardening agent, and spacer material may be glass beads, plastic beads, photosensitive epoxy resin, or the like. In addition, the polarizer affixed to the exterior sides of the liquid crystal cell may be, for example, a polarizer comprising cellulose acetate protective films sandwiching the polarizing film called "H film" which has absorbed iodine while a polyvinyl alcohol is stretched and aligned, or a polarizer composed of the H film itself.

EXAMPLES

The following examples are provided to illustrate the preferred embodiments of the invention, and should not be construed as limiting the scope of the invention.

Synthesis of a First Diamine Compound

Synthesis of 2,4-Diaminophenylacetic Acid Methyl Ester (A1-1)

A 250 ml three-necked conical flask equipped with a nitrogen inlet and a stirrer was purged with nitrogen, and was added with 2,4-dinitrophenylacetic acid (2.26 g, 0.01 mole), methanol (20 ml) and toluene (83 ml). Stirring was conducted at room temperature until 2,4-dinitrophenylacetic acid was dissolved. Trimethylsilyldiazomethane (8.3 ml) was then added, and reaction was conducted for 3 hours at room temperature. Solvent was removed by distilling under a reduced pressure and by drying at 70° C. to obtain 2,4-dinitrophenylacetic acid methyl ester (2.28 g, yield: 95%).

The obtained 2,4-dinitrophenylacetic acid methyl ester (2.28 g) was added into tetrahydrofuran (50 ml), and was dissolved by stirring at room temperature. Sodium borohydride (0.76 g, 0.02 mole) and aluminum trichloride (1.33 g, 0.01 mole) were then added, and reaction was conducted for 2 hours at room temperature. After the reaction, water (10 ml) was added to completely react with the remaining reductant. Solvent was removed by distilling under a reduced pressure to obtain 2,4-diaminophenylacetic acid methyl ester (1.73 g, yield: 90%).

Synthesis of 2,4-Diaminophenylpropanoic Acid Methyl Ester (A1-2)

A 250 ml three-necked conical flask equipped with a nitrogen inlet and a stirrer was purged with nitrogen, and was added with 2,4-dinitrophenylpropanoic acid (2.40 g, 0.01 mole), methanol (20 ml) and toluene (83 ml). Stirring was conducted at room temperature until 2,4-dinitrophenylpropanoic acid was dissolved. Trimethylsilyldiazomethane (8.3 ml) was then added, and reaction was conducted for 3 hours at room temperature. Solvent was removed by distilling under a reduced pressure and by drying at 70° C. to obtain 2,4-dinitrophenylpropanoic acid methyl ester (2.29 g, yield: 90%).

The obtained 2,4-dinitrophenylpropanoic acid methyl ester (2.29 g) was added into tetrahydrofuran (50 ml), and was dissolved by stirring at room temperature. Sodium borohydride (0.76 g, 0.02 mole) and aluminum trichloride (1.33 g, 0.01 mole) were then added, and reaction was conducted for 2 hours at room temperature. After the reaction, water (10 ml) was added to completely react with the remaining reductant. Solvent was removed by distilling under a reduced pressure to obtain 2,4-diaminophenylpropanoic acid methyl ester (1.67 g, yield: 86%).

Synthesis of 1,3-Diamino-4-(2-Butoxyethyl)Benzene (A1-3)

A 250 ml three-necked conical flask equipped with a nitrogen inlet, a stirrer, a heater, a condenser and a thermometer was purged with nitrogen, and was added with 2,4-dinitrophenylacetic acid (2.26 g, 0.01 mole) and tetrahydrofuran (50 ml). Stirring was conducted at room temperature until 2,4-dinitrophenylacetic acid was dissolved. Sodium borohydride (1.14 g, 0.03 mole) and aluminum trichloride (2.00 g, 0.015 mole) were then added, and reaction was conducted for 2 hours at room temperature. After the reaction, water (10 ml) was added to completely react with the remaining reductant.

Butyl bromide (1.37 g, 0.02 mole) was then added, and reaction was conducted for 4 hours at 80° C. The reaction obtained after the reaction was distillated under a reduced pressure to remove solvent and to obtain 1,3-Diamino-4-(2-Butoxyethyl)Benzene (1.74 g, yield: 84%).

Preparation of Polymer

Preparation of Polyamic Acid Polymer (P-1-1)

A 500 ml four-necked conical flask equipped with a nitrogen inlet, a stirrer, a heater, a condenser and a thermometer was purged with nitrogen, and was added with 2,4-diaminophenylacetic acid methyl ester (A1-1, 2.52 g, 0.014 mole), p-diaminobenzene (A2-1, 0.65 g, 0.006 mole), a compound represented by Formula (14) (A3-1, 16.92 g, 0.03 mole), and N-methyl-2-pyrrolidone (referred as to NMP hereinafter, 80 g). Stirring was conducted at room temperature until these compounds were dissolved in NMP.

2,3,5-tricarboxylcyclopentylacetic dianhydride (referred to as B-1 hereinafter, 11.20 g, 0.05 mole) and NMP (20 g) were then added, and reaction was conducted for 2 hours at room temperature. The reaction solution was then poured into water (1500 ml) to precipitate a polymer. The polymer obtained after filtering was washed with methanol and filtered three times, and was dried in a vacuum oven at 60° C. to obtain a polyamic acid polymer (P-1-1).

Preparation of Polyamic Acid Polymer (P-1-2)

A 500 ml four-necked conical flask equipped with a nitrogen inlet, a stirrer, a heater, a condenser and a thermometer was purged with nitrogen, and was added with 2,4-diaminophenylpropanoic acid methyl ester (A1-2, 2.91 g, 0.015 mole), 2,5-diaminotoluene (A2-2, 1.83 g, 0.015 mole), a compound represented by Formula (5) (A3-2, 7.37 g, 0.015 mole), 4,4'-diaminodiphenylsulfone (A3-3, 1.24 g, 0.005 mole), and NMP (80 g). Stirring was conducted at room temperature until these compounds were dissolved in NMP.

Pyromellitic dianhydride (referred to as B-2 hereinafter, 10.91 g, 0.05 mole) and NMP (20 g) were then added, and reaction was conducted for 2 hours at room temperature. The reaction solution was then poured into water (1500 ml) to precipitate a polymer. The polymer obtained after filtering was washed with methanol and filtered three times, and was dried in a vacuum oven at 60° C. to obtain a polyamic acid polymer (P-1-2).

Preparation of Polyamic Acid Polymer (P-1-3)

A 500 ml four-necked conical flask equipped with a nitrogen inlet, a stirrer, a heater, a condenser and a thermometer was purged with nitrogen, and was added with 1,3-diamino-4-(2-butoxyethyl)benzene (A1-3, 2.50 g, 0.012 mole), 4,4-diaminobiphenyl (A2-3, 0.65 g, 0.014 mole), 3,3'-dimethyl-4,4'-diaminobiphenyl (A2-4, 0.65 g, 0.014 mole), a compound represented by Formula (5) (A3-2, 16.92 g, 0.03 mole), and NMP (80 g). Stirring was conducted at room temperature until these compounds were dissolved in NMP.

B1 (5.60 g, 0.025 mole), B-2 (5.46 g, 0.025 mole), and NMP (20 g) were then added, and reaction was conducted for 2 hours at room temperature. The reaction solution was then poured into water (1500 ml) to precipitate a polymer. The polymer obtained after filtering was washed with methanol and filtered three times, and was dried in a vacuum oven at 60° C. to obtain a polyamic acid polymer (P-1-3).

Preparation of Polyamic Acid Polymers (P-1-4) and (P-1-5)

Polyamic acid polymers (P-1-4) and (P-1-5) were prepared in a manner identical to that of the preparation of polyamic acid polymer (P-1-1) using the diamine compounds and the tetracarboxylic dianhydride compounds shown in Table 1.

Preparation of Polyimide Polymer (P-2-1)

The preparation method is identical to that for the polyamic acid polymer (P-1-1) except that the period for the reaction of the diamine compounds with the tetracarboxylic dianhydride compound at room temperature was increased to 6 hours. After the reaction, NMP (100 g), acetic anhydride (2.55 g), and pyridine (19.75 g) were then added, and stirring was conducted at a temperature of 60° C. for 2 hours to conduct an imidization reaction. The reaction solution was then poured into water (1500 ml) to precipitate a polymer. The polymer obtained after filtering was washed with methanol and filtered three times, and was dried in a vacuum oven at 60° C. to obtain a polyimide polymer (P-2-1).

Preparation of Polyimide Polymer (P-2-2)

The preparation method is identical to that for the polyamic acid polymer (P-1-2) except that the period for the reaction of the diamine compounds with the tetracarboxylic dianhydride compound at room temperature was increased to 6 hours. After the reaction, NMP (100 g), acetic anhydride (4.59 g), and pyridine (19.75 g) were then added, and stirring was conducted at a temperature of 60° C. for 2 hours to conduct an imidization reaction. The reaction solution was then poured into water (1500 ml) to precipitate a polymer. The polymer obtained after filtering was washed with methanol and filtered three times, and was dried in a vacuum oven at 60° C. to obtain a polyimide polymer (P-2-2).

Preparation of Polyimide Polymer (P-2-3)

The preparation method is identical to that for the polyamic acid polymer (P-1-3) except that the period for the reaction of the diamine compounds with the tetracarboxylic dianhydride compound at room temperature was increased to 6 hours. After the reaction, NMP (100 g), acetic anhydride (6.64 g), and pyridine (19.75 g) were then added, and stirring was conducted at a temperature of 60° C. for 2 hours to conduct an imidization reaction. The reaction solution was then poured into water (1500 ml) to precipitate a polymer. The polymer obtained after filtering was washed with methanol and filtered three times, and was dried in a vacuum oven at 60° C. to obtain a polyimide polymer (P-2-3).

Preparation of Polyimide Polymers (P-2-4) to (P-2-7)

Polyimide Polymers (P-2-4) to (P-2-7) were prepared in a manner identical to that of the preparation of polyamide polymer (P-2-1) using the diamine compounds and the tetracarboxylic dianhydride compounds shown in Table 1. The amounts of acetic anhydride for the imidization reactions for the preparation of the Polyimide Polymers (P-2-4) to (P-2-7) were 3.57 g, 5.61 g, 7.66 g, and 8.68 g, respectively.

Preparation of Polyimide Polymers (P-2-8) and (P-2-9)

Polyimide Polymers (P-2-8) and (P-2-9) were prepared in a manner identical to that of the preparation of polyamide polymer (P-2-1) using the diamine compounds and the tetracarboxylic dianhydride compounds shown in Table 1. The amounts of acetic anhydride for the imidization reactions for the preparation of the Polyimide Polymers (P-2-8) and (P-2-9) were 3.57 g and 4.59 g, respectively.

Preparation of Polyamic Acid Series Block Copolymer (P-3-1)

The polyamic acid polymer (P-1-1) and the polyamic acid polymer (P-1-2) obtained were mixed in a solution, and were stirred at 60° C. for 6 hours to conduct a copolymerization reaction. The reaction solution was then poured into water (1500 ml) to precipitate a polymer. The polymer obtained after filtering was washed with methanol and filtered three times, and was dried in a vacuum oven at 60° C. to obtain a polyamic acid series block copolymer (P-3-1).

Preparation of Polyamic Acid-Polyimide Series Block Copolymer (P-3-2)

The polyamic acid polymer (P-1-2) and the polyimide polymer (P-2-7) obtained were mixed in a solution, and were stirred at 60° C. for 6 hours to conduct a copolymerization reaction. The reaction solution was then poured into water (1500 ml) to precipitate a polymer. The polymer obtained after filtering was washed with methanol and filtered three times, and was dried in a vacuum oven at 60° C. to obtain a polyamic acid-polyimide series block copolymer (P-3-2).

Preparation of Polyimide Series Block Copolymer (P-3-3)

The polyimide polymer (P-2-2) and the polyimide polymer (P-2-6) obtained were mixed in a solution, and were stirred at 60° C. for 6 hours to conduct a copolymerization reaction. The reaction solution was then poured into water (1500 ml) to precipitate a polymer. The polymer obtained after filtering was washed with methanol and filtered three times, and was dried in a vacuum oven at 60° C. to obtain a polyimide series block copolymer (P-3-3).

Calculation of Imidization Ratio:

Imidization ratio refers to a ratio of the number of the imide ring to a total of the number of the amic acid functional group and the number of the imide ring in polyimide polymer, and is expressed in percentage.

Polyimide polymer is dried under a reduced pressure, and is then dissolved in a proper deuteration solvent, for example, deuterated dimethylsulfoxide. $^1$H-NMR determination is conducted at room temperature (for example, 25° C.) using tetramethylsilane as a standard. The imidization ratio (in %) is calculated using the following formula:

$$\text{Imidization ratio(in \%)} = (1 - \Delta 1/(\Delta 2 \times \alpha)) \times 100$$

wherein $\Delta 1$ is a peak area produced by a chemical shift around 10 ppm of the proton of NH group;

$\Delta 2$ is a peak area of the proton other than that of NH group; and $\alpha$ is a ratio of the number of the proton of NH group to the number of the proton other than that of NH group in a precursor of polyimide polymer (i.e., polyamic acid polymer).

TABLE 1

| Components | | | Synthesis Examples | | | | | | | | | | | | |
|---|---|---|---|---|---|---|---|---|---|---|---|---|---|---|---|
| | | | P-1-1 | P-1-2 | P-1-3 | P-1-4 | P-1-5 | P-2-1 | P-2-2 | P-2-3 | P-2-4 | P-2-5 | P-2-6 | P-2-7 | P-2-8 | P-2-9 |
| Diamine compounds | Diamine compounds (A1) | A1-1 | 28 | | | | | 28 | | | 1 | | | 41 | 60 | |
| | | A1-2 | | 30 | | | | | 30 | | | 6 | | 40 | | |
| | | A1-3 | | | 24 | 20 | | | | 24 | | | 30 | | | |

TABLE 1-continued

| Components | | Synthesis Examples | | | | | | | | | | | | |
|---|---|---|---|---|---|---|---|---|---|---|---|---|---|---|
| | | P-1-1 | P-1-2 | P-1-3 | P-1-4 | P-1-5 | P-2-1 | P-2-2 | P-2-3 | P-2-4 | P-2-5 | P-2-6 | P-2-7 | P-2-8 | P-2-9 |
| Diamine compounds (A2) | A2-1 | 12 | | | | | 12 | | | 9 | | | | | 80 |
| | A2-2 | | 30 | | | 40 | | 30 | | | | | 9 | | |
| | A2-3 | | | 28 | | | | | 28 | | 24 | 10 | | | |
| | A2-4 | | | 28 | | | | | 28 | | | 10 | | | |
| Diamine compounds (A3) | A3-1 | 60 | | | 80 | | 60 | | | 50 | | 35 | 10 | 40 | 20 |
| | A3-2 | | 30 | 20 | | 60 | | 30 | 20 | 40 | 60 | | | | |
| | A3-3 | | | 10 | | | | 10 | | | 10 | 15 | | | |
| Total amount of (A1) and (A2) | | 40 | 60 | 80 | 20 | 40 | 40 | 60 | 80 | 10 | 30 | 50 | 90 | 60 | 80 |
| (A1)/(A2) | | 70/30 | 50/50 | 30/70 | 100/0 | 0/100 | 70/30 | 50/50 | 30/70 | 10/90 | 20/80 | 60/40 | 90/10 | 100/0 | 0/100 |
| Tetracarboxylic dianhydride compounds (B) (mole %) | B-1 | 100 | | 50 | 100 | | 100 | | 50 | 100 | | | | | 50 |
| | B-2 | | 100 | 50 | | 100 | | 100 | 50 | | 100 | | 50 | | |
| | B-3 | | | | | | | | | | | 100 | 50 | 100 | 50 |
| Imidization ratio (%) | | 0 | 0 | 0 | 0 | 0 | 13 | 32 | 54 | 25 | 41 | 63 | 78 | 23 | 31 |

Notes:
A1-1: 2,4-diaminophenylacetic acid methyl ester
A1-2: 2,4-diaminophenylpropanoic acid methyl ester
A1-3: 1,3-diamino-4-(2-butoxyethyl)benzene
A2-1: p-diaminobenzene
A2-2: 2,5-diaminotoluene
A2-3: 4,4-diaminobiphenyl
A2-4: 3,3'-dimethyl-4,4'-diaminobiphenyl
A3-1: a compound represented by Formula (14)
A3-2: a compound represented by Formula (5)
A3-3: 4,4'-diaminodiphenylsulfone
B-1: 2,3,5-tricarboxylcyclopentylacetic dianhydride
B-2: Pyromellitic dianhydride
B-3: 1,2,3,4-cyclobutanetetracarboxylic dianhydride Preparation of Liquid Crystal Display Element Preparation of Liquid Crystal Display Element (Cell-1)

100 parts by weight of polymer (P-1-1) and 10 parts by weight of N,N,N',N'-tetraglycidyl-4,4'-diaminodiphenyl-methane (referred to as C-1 hereinafter) were dissolved in a co-solvent of 725 parts by weight of NMP (S-1)/725 parts by weight of ethylene glycol butyl ether (S-2) at room temperature to form a liquid crystal alignment agent. The liquid crystal alignment agent was coated onto two glass substrates each having an ITO (indium-tin-oxide) conductive film using a printing machine (manufactured by Japan Nissha Printing Co., Ltd., Model S15-036), after which the glass substrates coated with the alignment agent solution were pre-baked on a heating plate at a temperature of 100° C. for five minutes, and were then post-baked in a hot air circulation baking oven at a temperature of 220° C. for 30 minutes to form a film on each of the glass substrates. The thickness of the film was measured to be around 800±200 Å using a film thickness measuring device (manufactured by KLA-Tencor, Model Alpha-step 500).

Thermo-compression adhesive agent was applied to one of the glass substrates formed with the liquid crystal alignment films, and spacers of 4 μm were sprayed on the other of the glass substrates formed with the liquid crystal alignment films. The two glass substrates were aligned and bonded together in a vertical direction, and then 10 kg of pressure was applied using a thermo-compressor to carry out thermo-compression at 150° C. Liquid crystal was poured using a liquid crystal pouring machine (manufactured by Shimadzu Corporation, Model ALIS-100X-CH), ultraviolet light was then used to harden a sealant to seal the liquid crystal injection hole, and an annealing treatment was conducted in an oven at 60° C. for 30 minutes, thereby manufacturing a liquid crystal display element (Cell-1).

Preparation of Liquid Crystal Display Elements (Cell-2 to Cell-17)

The liquid crystal display elements (Cell-2 to Cell-17) were prepared in a manner identical to that of the preparation of the liquid crystal display element (Cell-1) using the polymers, the organic solvents, and the additives shown in Table 2.

The voltage holding ratio and the reliability of the liquid crystal display elements (Cell-1 to Cell-17) were evaluated according to the following evaluation methods.

Voltage Holding Ratio:

The voltage holding ratio was measured using an electrical measuring machine (manufactured by TOYO Corporation, Model 6254). A voltage of 4 volts was applied for 120 microseconds. The applied voltage was held for 16.67 milliseconds. After the applied voltage was cut off for 16.67 milliseconds, the voltage holding ratio was measured and evaluated according to the following standards:
⊚: Voltage holding ratio≥98%
○: 98%>Voltage holding ratio≥96%
Δ: 96%>Voltage holding ratio≥94%
X: Voltage holding ratio<94%

Reliability:

The reliability of the liquid crystal display elements (Cell-1 to Cell-17) was carried out at a temperature of 65° C. and relative humidity of 85% for 120 hours, and then the voltage holding ratio was measured using the aforesaid evaluation method. The reliability of the liquid crystal display elements was evaluated according to the following standards:
⊚: Voltage holding ratio≥94%
○: 94%>Voltage holding ratio≥92%
Δ: 92%>Voltage holding ratio≥90%
X: Voltage holding ratio<90%

The evaluation results of the voltage holding ratio and the reliability of the liquid crystal display elements (Cell-1 to Cell-17) are shown in Table 2:

TABLE 2

| Components | | Liquid Crystal Display Elements - Examples | | | | | | | | |
|---|---|---|---|---|---|---|---|---|---|---|
| | | Cell-1 | Cell-2 | Cell-3 | Cell-4 | Cell-5 | Cell-6 | Cell-7 | Cell-8 | Cell-9 |
| Polymers (pbw) | P-1-1 | 100 | | | | | | | | |
| | P-1-2 | | 100 | | | | | | | |
| | P-1-3 | | | 100 | | | | | | |
| | P-1-4 | | | | | | | | | |
| | P-1-5 | | | | | | | | | |
| | P-2-1 | | | | 100 | | | | | |
| | P-2-2 | | | | | 100 | | | | |
| | P-2-3 | | | | | | 100 | | | |
| | P-2-4 | | | | | | | 100 | | |
| | P-2-5 | | | | | | | | 100 | |
| | P-2-6 | | | | | | | | | 100 |
| | P-2-7 | | | | | | | | | |
| | P-2-8 | | | | | | | | | |
| | P-2-9 | | | | | | | | | |
| | P-3-1 | | | | | | | | | |
| | P-3-2 | | | | | | | | | |
| | P-3-3 | | | | | | | | | |
| Organic solvents (pbw) | S-1 | 725 | | | 1000 | 1275 | 1500 | | | 1000 |
| | S-2 | 725 | 1500 | | 500 | | | 1500 | | 500 |
| | S-3 | | | 1800 | | 165 | | | 1800 | |
| Additives (pbw) | C-1 | 10 | | 5 | 10 | 5 | | 10 | | 5 |
| | C-2 | | 10 | 5 | | | 5 | | 10 | 5 |
| Results | Voltage holding ratio | ◎ | ◎ | ◎ | ◎ | ◎ | ◎ | ◎ | ◎ | ◎ |
| | reliability | ○ | ○ | ○ | ◎ | ◎ | ◎ | ◎ | ◎ | ◎ |

| Components | | Liquid Crystal Display Elements | | | | | | | |
|---|---|---|---|---|---|---|---|---|---|
| | | Examples | | | | Comparative Exampels | | | |
| | | Cell-10 | Cell-11 | Cell-12 | Cell-13 | Cell-14 | Cell-15 | Cell-16 | Cell-17 |
| Polymers (pbw) | P-1-1 | | | | | | | | |
| | P-1-2 | | | | | | | | |
| | P-1-3 | | | | | | | | |
| | P-1-4 | | | | | 100 | | | |
| | P-1-5 | | | | | | 100 | | |
| | P-2-1 | | | | | | | | |
| | P-2-2 | | | | | | | | |
| | P-2-3 | | | | | | | | |
| | P-2-4 | | | | | | | | |
| | P-2-5 | | | | | | | | |
| | P-2-6 | | | | | | | | |
| | P-2-7 | 100 | | | | | | | |
| | P-2-8 | | | | | | | 100 | |
| | P-2-9 | | | | | | | | 100 |
| | P-3-1 | | 100 | | | | | | |
| | P-3-2 | | | 100 | | | | | |
| | P-3-3 | | | | 100 | | | | |
| Organic solvents (pbw) | S-1 | 1275 | 725 | 1000 | 725 | 1000 | 1275 | 725 | 1000 |
| | S-2 | | 725 | 500 | | 500 | | 725 | 500 |
| | S-3 | 165 | | 300 | 725 | | 165 | | 300 |
| Additives (pbw) | C-1 | 10 | 5 | | | 10 | | 5 | 5 |
| | C-2 | | | 5 | 10 | | 10 | 5 | 5 |
| Results | Voltage holding ratio | ◎ | ◎ | ◎ | ◎ | X | X | Δ | Δ |
| | reliability | ◎ | ◎ | ◎ | ◎ | Δ | Δ | X | X | pbw: part by weight
S-1: 1-methyl-2-pyrrolidone
S-2: ethylene glycol n-butyl ether
S-3: N,N-dimethylacetamide
C-1: N,N,N',N'-tetraglycidyl-4,4'-diaminodiphenylmethane
C-2: N,N-glycidyl-p-glycidoxyaniline As shown in Table 2, all of the evaluated properties of the voltage holding ratio and the reliability of the liquid crystal display elements (Cell-1 to Cell-13) are good. However, the voltage holding ratio and the reliability of the liquid crystal display elements (Cell-14 to Cell-17) are inferior as compared to those of the liquid crystal display elements (Cell-1 to Cell-13).

In view of the aforesaid, the liquid crystal alignment agent of the present invention, which includes a polymer obtained by subjecting a specific diamine composition and a tetracarboxylic dianhydride compound to a polymerization reaction, possesses improved alignment properties in terms of voltage holding ratio and reliability.

While the present invention has been described in connection with what are considered the most practical and preferred embodiments, it is understood that this invention is not limited to the disclosed embodiments but is intended to cover various arrangements included within the spirit and scope of the broadest interpretation and equivalent arrangements.

What is claimed is:

1. A liquid crystal alignment agent, comprising:
a polymer obtained by subjecting a diamine composition and a tetracarboxylic dianhydride compound to a polymerization reaction; and
a solvent for dissolving said polymer,
wherein said diamine composition includes
a first diamine compound represented by formula (I-1),

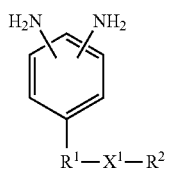

(I-1)

wherein
$R^1$ is a $C_1$-$C_3$ alkylene group,
$X^1$ is selected from the group consisting of an oxy group, an ester group, a keto group, and an amide group, and
$R^2$ is selected from the group consisting of a $C_1$-$C_6$ alkyl group, a $C_1$-$C_6$ alkoxy group, a $C_1$-$C_6$ aklenyl group, a $C_6$-$C_{20}$ aryl group, and a $C_7$-$C_{20}$ aralkyl group,
a second diamine compound which is at least one selected from the group consisting of compounds represented by the following formulae (I-2) to (I-5),

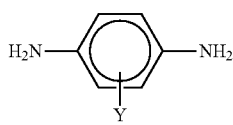

(I-2)

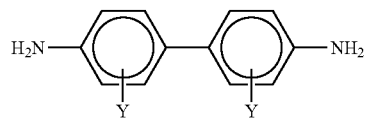

(I-3)

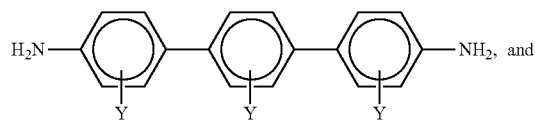

(I-4)

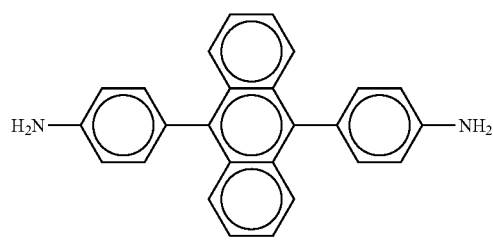

(I-5)

wherein
each Y is independently selected from the group consisting of hydrogen, an alkyl group, an amido group, an alkoxy group, and a halogen, and
each Y in formulae (I-3) and (I-4) may be the same or different, and
a third diamine compound with the proviso that said third diamine compound is different from either one of said first diamine compound and said second diamine compound, and
wherein a total amount of said first and second diamine compounds ranges from 10 to 90 mole % based on 100 mole % of said diamine composition.

2. The liquid crystal alignment agent as claimed in claim 1, wherein the total amount of said first and second diamine compounds ranges from 20 to 90 mole % based on 100 mole % of said diamine composition.

3. The liquid crystal alignment agent as claimed in claim 2, wherein the total amount of said first and second diamine compounds ranges from 30 to 90 mole % based on 100 mole % of said diamine composition.

4. The liquid crystal alignment agent as claimed in claim 1, wherein a molar ratio of said first diamine compound to said second diamine compound ranges from 90/10 to 10/90.

5. The liquid crystal alignment agent as claimed in claim 1, wherein said polymer has an imidization ratio ranging from 5 to 90%.

6. The liquid crystal alignment agent as claimed in claim 5, wherein said imidization ratio ranges from 10 to 75%.

7. The liquid crystal alignment agent as claimed in claim 6, wherein said imidization ratio ranges from 20 to 60%.

8. A liquid crystal alignment film formed from the liquid crystal alignment agent as claimed in claim 1.

9. A liquid crystal display element, comprising the liquid crystal alignment film as claimed in claim 8.

* * * * *